United States Patent [19]

Wahlquist

[11] Patent Number: 4,495,519
[45] Date of Patent: Jan. 22, 1985

[54] TEST PATTERN GENERATORS

[75] Inventor: Clayton C. Wahlquist, West Valley City, Utah

[73] Assignee: Tektronix, Inc., Beaverton, Oreg.

[21] Appl. No.: 393,569

[22] Filed: Jun. 30, 1982

[51] Int. Cl.³ .............................................. H04N 7/02
[52] U.S. Cl. ................................... 358/139; 358/150; 331/153
[58] Field of Search ................. 358/139, 10, 150; 328/187, 188, 189, 185, 181; 331/20, 143, 145, 153, 172, 173

[56] References Cited

U.S. PATENT DOCUMENTS 3,376,518  4/1968  Emmer ............................... 331/153

Primary Examiner—John C. Martin
Assistant Examiner—Edward L. Coles
Attorney, Agent, or Firm—John Smith-Hill

[57] ABSTRACT

A test pattern generator comprises vertical line pulse generating circuit (20) for generating a first pulse train (VL) and a second pulse train (Hi), the first pulse train being used to display vertical lines on a raster scan display apparatus and including, between successive pulses of the second pulse train, a number of pulses equal to the number of vertical lines. A horizontal sync pulse generating circuit (30) receives the second pulse train and generating a horizontal sync pulse train (M sync). A vertical blanking and sync pulse generating circuit (40, 42, 44, 46) is connected to the horizontal sync pulse generating circuit for generating a vertical sync pulse train (V sync) and a vertical blanking pulse train (Vb), and a horizontal line pulse generating circuit (50) generates a horizontal line pulse train (HL), used to display horizontal lines, in response to the horizontal sync pulse train and the vertical blanking pulse train.

30 Claims, 19 Drawing Figures

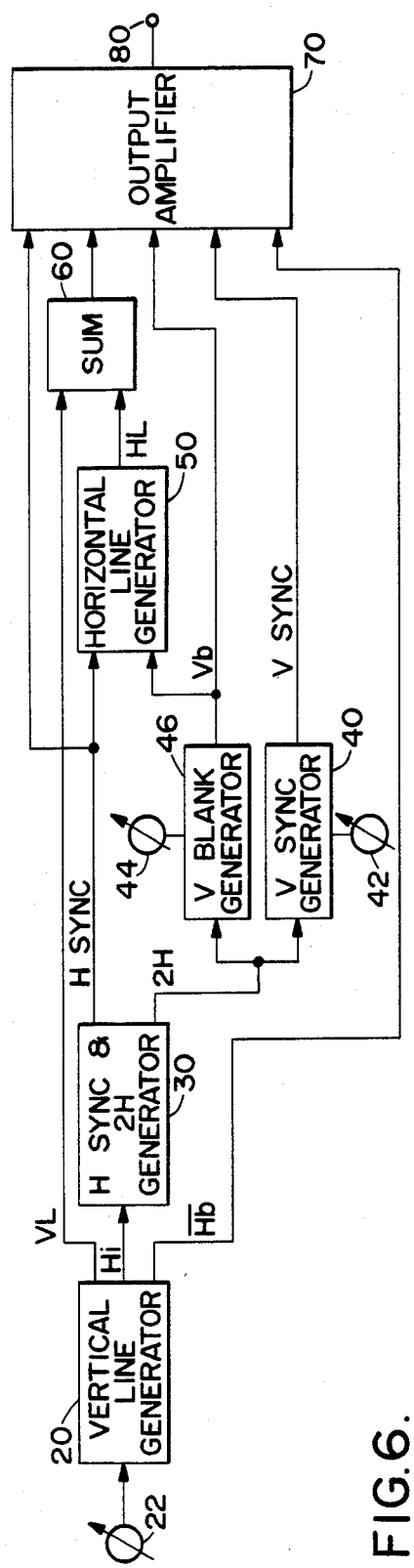
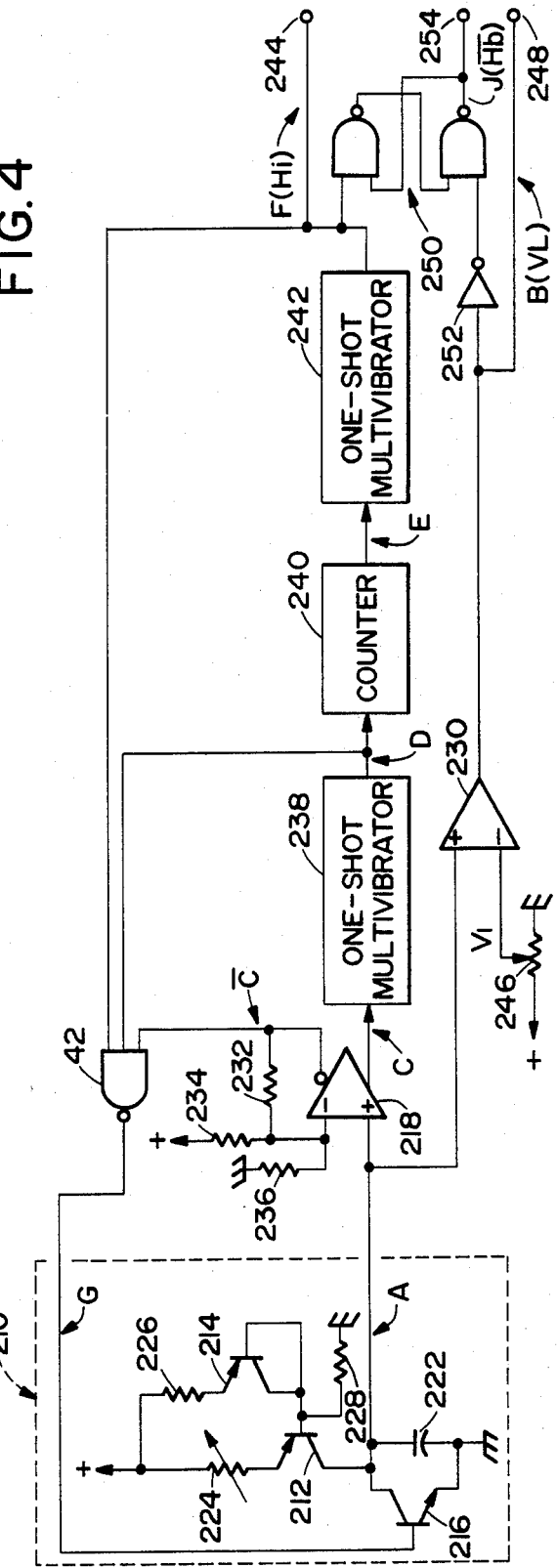
FIG. 4
FIG. 6.

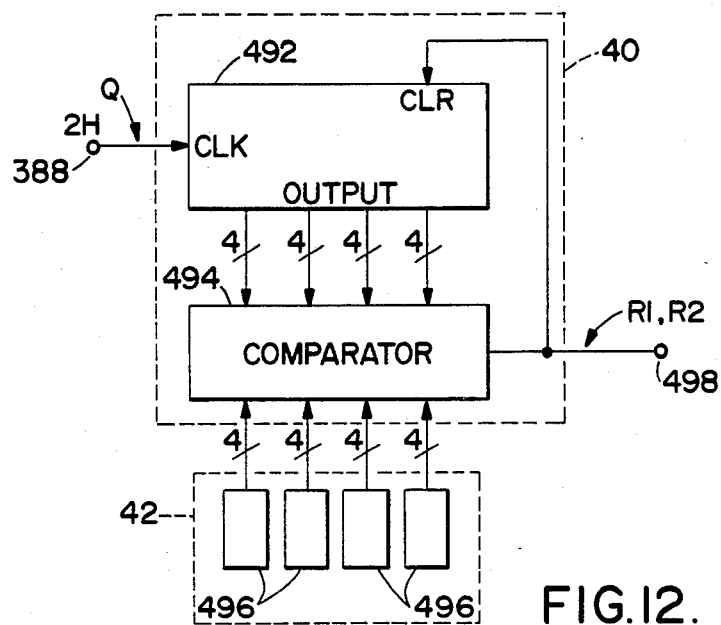
FIG.12.
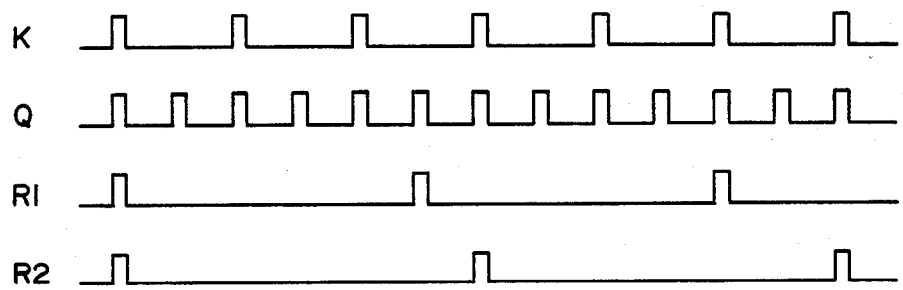
FIG.13.
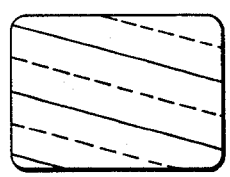       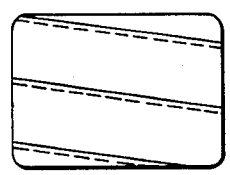
FIG.14.           FIG.15.

TEST PATTERN GENERATORS

This invention relates to test pattern generators for displaying a test pattern consisting of lines with predetermined orientations on a raster scan display apparatus, and to line generating circuits for such test pattern generators.

BACKGROUND OF THE INVENTION

There are many forms for display apparatus employing a raster scan, such as TV receivers and picture monitors. Such type of apparatus is referred to herein as a raster scan display apparatus. For evaluating a raster scan display apparatus, it is convenient to display a test pattern, such as vertical lines, horizontal lines or a combination of vertical and horizontal lines, on a screen of the display apparatus. The displayed test pattern is compared with a standard graticule attached to the screen to measure linearity, pincushion distortion and also convergence.

Different horizontal frequencies, scan lines per field and vertical frequencies are used in different TV systems. Each different system needs a proper test pattern generator which generates a proper test pattern for the system. If the test pattern generator of one system is employed with a raster scan display apparatus of another system, the test pattern may not be displayed because of a synchronization problem. With conventional techniques, even if the display apparatus can accept the output signal from the test pattern generator, the number and spatial width of the displayed vertical lines may change, and the number of the displayed horizontal lines may change. Thus, using conventional techniques, each TV system needs its own test pattern generator in order to provide a predetermined test pattern for evaluation. In order to search for scan rates which display interactions such as a Moire pattern, or to calibrate displays at nonstandard scan rates, it is necessary to provide a test pattern signal having a continuum of horizontal frequencies, scan lines per field, and vertical frequencies. However, conventional test pattern generators cannot generate a test pattern at variable frequencies without changing the displayed pattern.

The present invention may be used to provide a test pattern generator which generates a test pattern signal which can be employed in a TV system with continuously variable vertical and horizontal frequencies and scan lines per field. The invention may also be used to provide a test pattern generator for displaying a substantially constant test pattern on a raster scan display apparatus regardless of the vertical and horizontal scanning frequencies and the number of scan lines per field.

BRIEF DESCRIPTION OF THE DRAWINGS

For a better understanding of the invention, and to show how the same may be carried into effect, reference will now be made, by way of example, to the accompanying drawings in which:

FIG. 4 is a block diagram of a test pattern generator embodying the present invention;

FIG. 6 is a partly schematic block diagram of a first component of the test pattern generator;

FIG. 12 is a block diagram of part of a third component of the test pattern generator;

FIGS. 13 through 15 show waveforms and displays for explaining the operation of FIG. 12;

DETAILED DESCRIPTION

Figure 3:
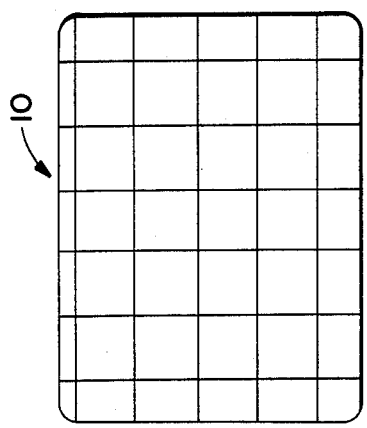
FIGS. 2 and 3 shows additional test patterns displayed on a raster scan display apparatus.
Figure 1A:
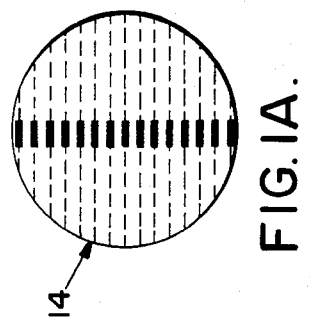
FIG. 1A shows an enlarged view of a detail of FIG. 1.
Figure 2:
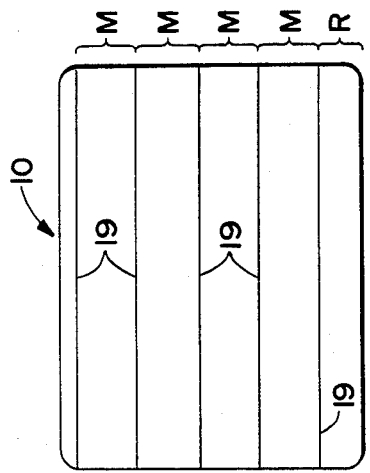
Figure 1:
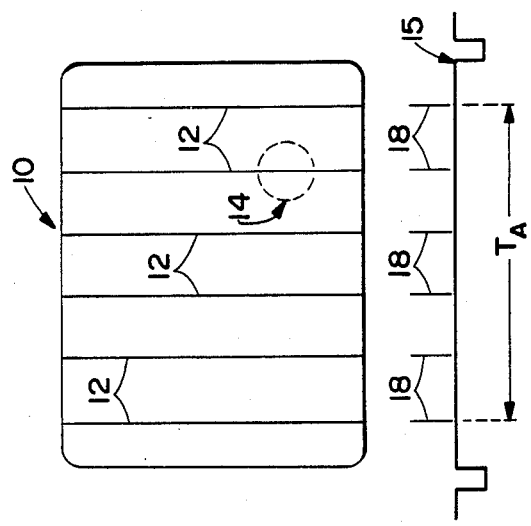
FIG. 1 shows a test pattern of vertical lines displayed on a raster scan display apparatus and one line of a video signal.

FIGS. 1, 2 and 3 illustrate a display screen 10 showing typical test patterns comprising vertical lines 12 (FIG. 1), horizontal lines 19 (FIG. 2) and a combination of vertical and horizontal lines (FIG. 3). In order to measure linearity, pincushion distortion and convergence, the displayed test patterns are compared with a standard graticule (not shown) which is attached to the screen.

The pattern shown in FIG. 1 comprises six vertical lines. A portion 14 of screen 10 is shown in FIG. 1A in detail, wherein continuous thick lines and dotted lines respectively represent components of a vertical line 12 and raster lines. Video signal 15, one line of which is shown in FIG. 1, includes six pulses 18 in one horizontal active time $T_A$. The spatial width of each vertical line 12 is determined by the ratio of the duration of each pulse 18 to the horizontal active time. If the duration of pulse 18 is fixed, the spatial width of vertical line 12 will change if the horizontal active time is changed. If the interval between pulses 18 is fixed, the number of pulses 18 changes if the horizontal active time is changed. By use of the test pattern generator of FIG. 4, the spatial width and number of vertical lines 12 is kept constant regardless of the horizontal active time by keeping constant the number of pulses 18 and the ratio of the duration of pulse 18 to the horizontal active time.

The pattern shown in FIG. 2 comprises a predetermined number, N (integer), of horizontal bright lines 19. There are M (integer) dark raster lines (not shown) between adjacent bright lines. For many of the possible choices of N, there will be a remainder R (integer) of dark raster lines (not shown) left at the bottom of the display. The total number of raster lines per field, $L_T$, is $$L_T = N + M(N-1) + R + B$$

where B (integer) is the number of raster lines in the vertical blanking period. By use of the test pattern generator of FIG. 4, as the number of (active) raster lines per frame is varied, M is automatically adjusted so R is less than $N-1$. This ensures that the appearance of the pattern remains similar when the number of lines per frame is changed. In other words, M is increased until R becomes less than $N-1$ when R is larger than or equal to $N-1$. M is set to zero when the vertical blanking period starts before N bright horizontal lines have been completed. (After M has been set to zero, it is adjusted as described hereinbefore). Therefore, the predetermined number (N) of bright horizontal lines will be displayed regardless of the number of raster lines per frame. It should be noted that if B can be varied, then for any given total number of raster lines, B can be adjusted so that R equals zero.

The pattern shown in FIG. 3 is a combination of the two patterns shown in FIGS. 1 and 2 respectively.

The pattern generator shown in FIG. 4 comprises a vertical line generator 20 which generates vertical line pulses (VL), horizontal interval hold-off pulses (Hi) and horizontal blanking pulses ($\overline{Hb}$). The number of vertical line pulses occurring during each horizontal interval hold-off pulse is a predetermined number such as six, and the width of the hold-off pulse is predetermined. The interval between the first and last (sixth) vertical line pulses is defined as the horizontal active time ($T_A$), and controller 22 adjusts the horizontal active time. The number of vertical pulses in the horizontal active time and the ratio of the vertical line pulse duration to the horizontal active time do not change even if the horizontal active time varies. Horizontal sync and control signal generator 30 is triggered by the horizontal interval hold-off pulses for generating a horizontal sync signal (H sync) and a control signal (2H) synchronized therewith. The frequency of the control signal is double the frequency of the horizontal sync signal.

Vertical sync generator 40 and vertical blanking generator 46 include respective counters (not particularly shown in FIG. 4) which count the control signal (2H) for generating a vertical sync pulse (V sync) and a vertical blanking pulse (Vb). Controller 42 controls the number of the scan lines in a frame, and controller 44 controls the number of scan lines in the vertical blanking period. Since generator 40 receives the 2H signal, interlaced and noninterlaced formats can be obtained by controller 42. As will be described in further detail hereinafter, the interlaced format is obtained when controller 42 selects an odd number of scan lines and the noninterlaced format is selected when controller 42 selects an even number of scan lines.

Horizontal line generator 50 generates a horizontal line pulse (HL) in response to the horizontal sync signal and the vertical blanking pulse. It should be noted that the number of horizontal line pulses in one field is a predetermined number such as five, and the number of horizontal sync pulses between one horizontal line pulse and the next horizontal line pulse is automatically adjusted so that equally spaced horizontal bright lines are displayed on the raster scan display apparatus regardless of the number of scan lines in one field. Summing circuit 60 may be a NAND or OR gate which sums the vertical and horizontal line pulses. Output amplifier 70 receives the horizontal sync pulse, the output from summing circuit 60, the vertical blanking pulse, the vertical sync pulse and the horizontal blanking pulse, and supplies a test pattern video signal as shown in FIG. 5 to output terminal 80.

Figure 5:
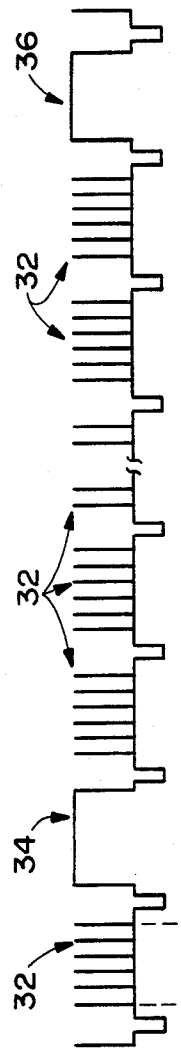
FIG. 5 shows the waveform of the test pattern signal generated by the test pattern generator of FIG. 4.

The video signal shown in FIG. 5 produces the convergence crosshatch pattern shown in FIG. 3, which is obtained by combining the patterns of FIGS. 1 and 2. Thus, the signal includes pulses 132 which are used for displaying the vertical lines and pulses 134 and 136 which are used for displaying horizontal lines. The horizontal frequency of the test pattern signal is adjusted by controller 22, the number of the scan lines per field is adjusted by controller 42, and the vertical frequency is determined by controllers 22 and 42 in combination.

Vertical line generator 20 will be described in detail with reference to FIG. 6. Vertical line generator 20 comprises a ramp generator 210 which generates a constant amplitude ramp signal. Ramp generator 210 mainly consists of transistors 212, 214 and 216, comparator 218, NAND gate 220, and capacitor 222. The emitter of transistor 212 is connected to a positive voltage source through variable resistor 224, and the base thereof is connected to a voltage divider consisting of diode connected transistor 214 and resistors 226 and 228. These components form a constant current source, and a constant current is applied from the collector of transistor 212 to one terminal of capacitor 222, the other terminal of which is grounded. Diode connected transistor 214 compensates for effects of temperature on the base-emitter voltage of transistor 212. The collector and emitter of switching transistor 216 are connected to respective terminals of capacitor 222, and the base thereof is connected to the output terminal of NAND gate 220. One terminal of capacitor 222 is connected to the non-inverting input terminal of comparator 218 and to the non-inverting input of comparator 230. Resistor 232 is inserted between the inverting output and input terminals of comparator 218, and the inverting input terminal is connected to the junction of resistors 234 and 236, which are connected between the positive voltage source and ground. These resistors 232, 234 and 236 apply a hysteresis characteristic to comparator 218. The inverting and non-inverting output terminals of comparator 218 are applied to NAND gate 220 and one-shot multivibrator 238 respectively. NAND gate 220 further receives the output from multivibrator 238. Counter 240 counts the output from multivibrator 238, and supplies the output to one-shot multivibrator 242 when counter 240 counts a predetermined number of input pulses. The output of multivibrator 242 is connected to NAND gate 220, cross-coupled NAND gates 250 and horizontal interval holdoff terminal 244. Comparator 230 receives at its inverting input terminal a voltage from potentiometer 246, and supplies the output to vertical line pulse output terminal 248 and, through inverter 252 and cross-coupled NAND gates 250, to horizontal blanking terminal 254.

Figure 7:
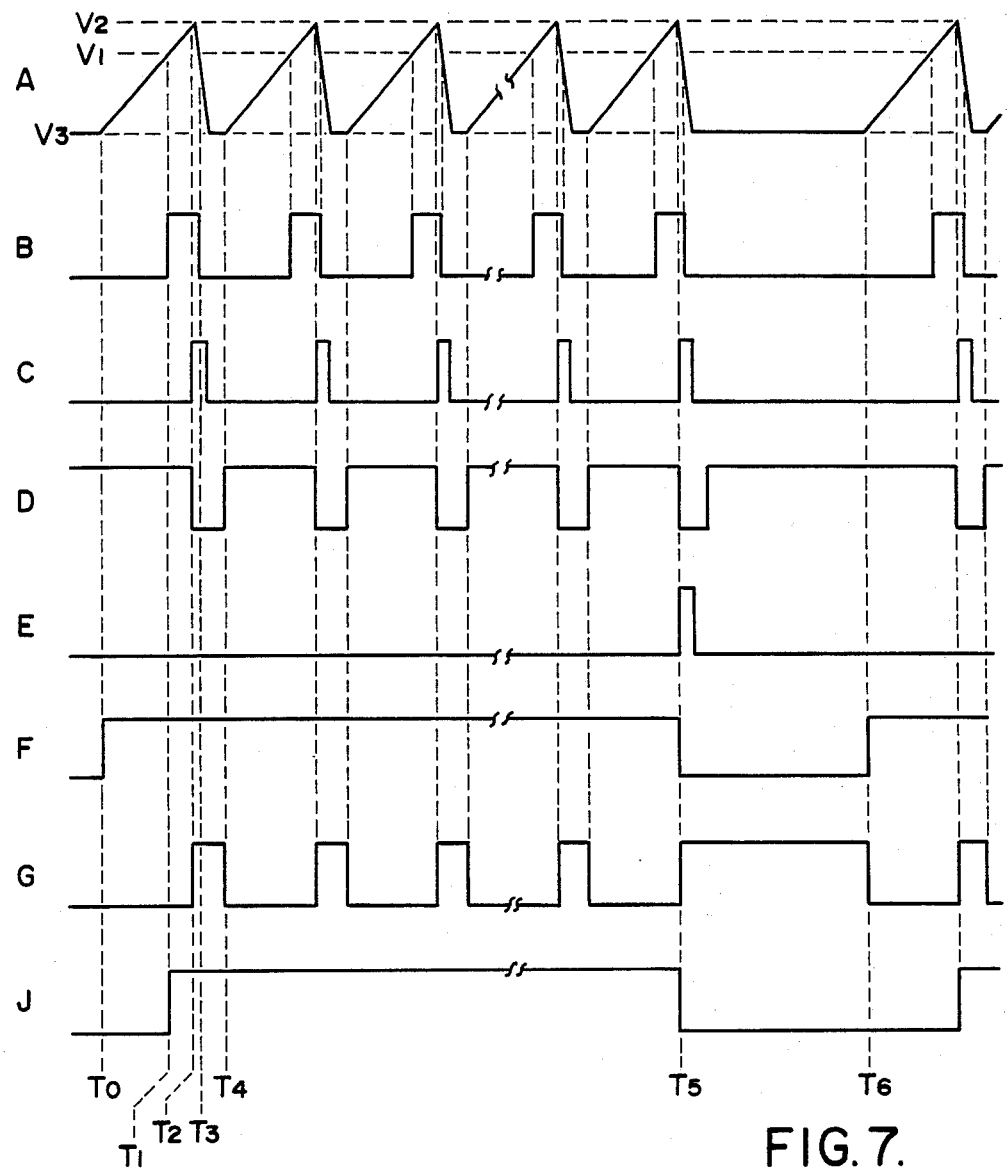
FIGS. 7 and 8 show waveforms for explaining the operation of FIG. 6.

The operation of FIG. 6 is as follows. If transistor 216 turns off at time $T_0$ (FIG. 7) the constant current from transistor 212 charges capacitor 222 for producing a ramp waveform A. When the ramp waveform A crosses a predetermined voltage level $V_1$ set by potentiometer 246 at time $T_1$, the output of comparator 230 changes from "Low" to "High" (waveform B). The ramp waveform A further increases and the level thereof becomes a predetermined voltage $V_2$ at time $T_2$. The voltage $V_2$ is determined by the "High" output level from comparator 218, the positive voltage level, and the values of resistors 232, 234 and 236. The non-inverting output of comparator 218 changes from "Low" to "High" (waveform C) and the inverting output thereof changes from "High" to "Low". The output of multivibrator 242 is "High". Therefore, when the inverting output of comparator 218 changes from "High" to "Low" the output of NAND gate 220 changes from "Low" to "High", turning transistor 216 on. Capacitor 222 starts to discharge, and the voltage of waveform A decreases. Owing to the hysteresis characteristic of comparator 218, the comparator 218 generates a narrow pulse at its outputs (waveform C). One-shot multi-vibrator 238 is triggered by the positive-going output pulse from the non-inverting output of comparator 218 and generates an output pulse (waveform D) having a predetermined pulse width such as 85 nsec, i.e., multi-vibrator 238 converts the narrow output pulse of comparator 218 into a pulse of predetermined greater width because the output pulse of comparator 218 is too narrow to drive counter 240 and hold transistor 216 on sufficiently long for capacitor 222 to discharge. As the capacitor 222 discharges, the voltage of ramp waveform A decreases from its peak value $V_2$. When the ramp waveform A crosses the voltage $V_1$ at time $T_3$, the output of comparator 230 changes from "High" to "Low" (waveform B). The ramp waveform A further decreases to a predetermined voltage $V_3$, and the voltage $V_3$ is maintained until time $T_4$, when the multivibrator 238 times out and its output changes from "High" to "Low" and accordingly NAND gate 220 turns transistor 38 off. The voltage $V_3$ may be zero volts and is determined by the "Low" output level of comparator 218, the positive voltage source and resistors 232, 234 and 236. The sequence of operations is then repeated.

Counter 240 counts the number of pulses from multivibrator 238, and consequently also the number of pulses from comparator 230, and generates an output pulse (waveform E at time $T_5$) when the number of pulses is equal to the number of vertical lines 12 on screen 10. One-shot multivibrator 242 is triggered by the pulse from counter 240 to produce the negative-going horizontal interval hold-off pulse Hi (waveform F) having a predetermined duration. So long as the pulse Hi persists, transistor 216 remains on to inhibit the operation of ramp generator 210. At time $T_6$, the pulse Hi ends and the output of multivibrator 242 returns "High". One cycle of operation, generating one raster line, is thus completed. After time $T_6$, the above sequence of operations is repeated. The pulses produced by the comparator 230 are the desired vertical line pulses VL, and are applied to the terminal 248. The horizontal interval hold-off pulses Hi are gated with the vertical line pulses VL by the inverter 252 and NAND gates 250 to generate the horizontal blanking pulses $\overline{Hb}$.

Figure 8:
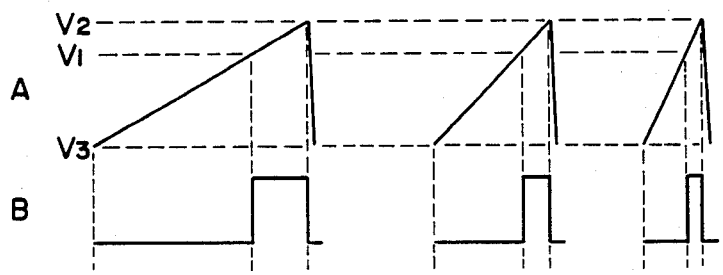

Variable resistor 224 constitutes the controller 22 of FIG. 4. If the value of variable resistor 224 is changed, the value of the constant current from transistor 212 is changed and the slope of the ramp waveform is changed as shown in FIG. 8. Thus, the interval between times $T_0$ and $T_4$ changes, and the horizontal active time (interval between times $T_0$ and $T_5$) changes. However, the number of vertical line pulses VL remains constant, because the number of vertical line pulses VL is controlled by counter 240. In addition, the ratio of the width of the vertical line pulse VL to the horizontal active time does not change, because the voltages $V_1$, $V_2$, and $V_3$ are constant. Therefore, the width and number of vertical lines 12 on screen 10 remain constant regardless of the horizontal active time. The spatial width of vertical lines 12 can be controlled by potentiometer 246.

Figure 9:
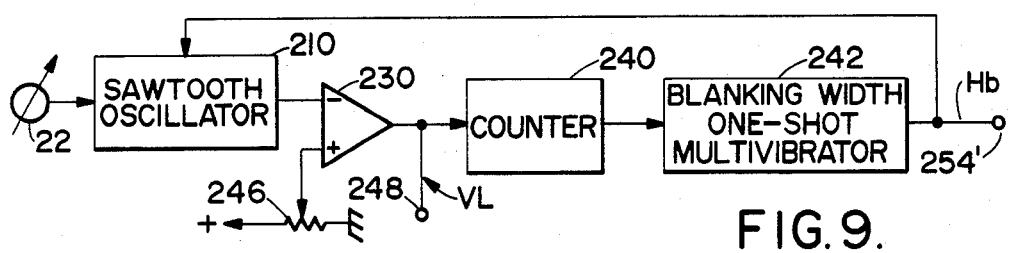
FIG. 9 is a block diagram of an alternative form of the first component of the test pattern generator.

FIG. 9 shows an alternative construction of the vertical line generator. In FIG. 9, elements which correspond to those shown in FIG. 6 are designated by like reference numerals, and only the differences from FIG. 6 will be discussed. In FIG. 9, counter 240 receives the output pulse from comparator 230, and one-shot multivibrator 238 of FIG. 6 is eliminated. Controller 22 controls the slope of the ramp waveform from sawtooth generator 210, and the output from one-shot multivibrator 242 inhibits the operation of generator 210.

Figure 10:
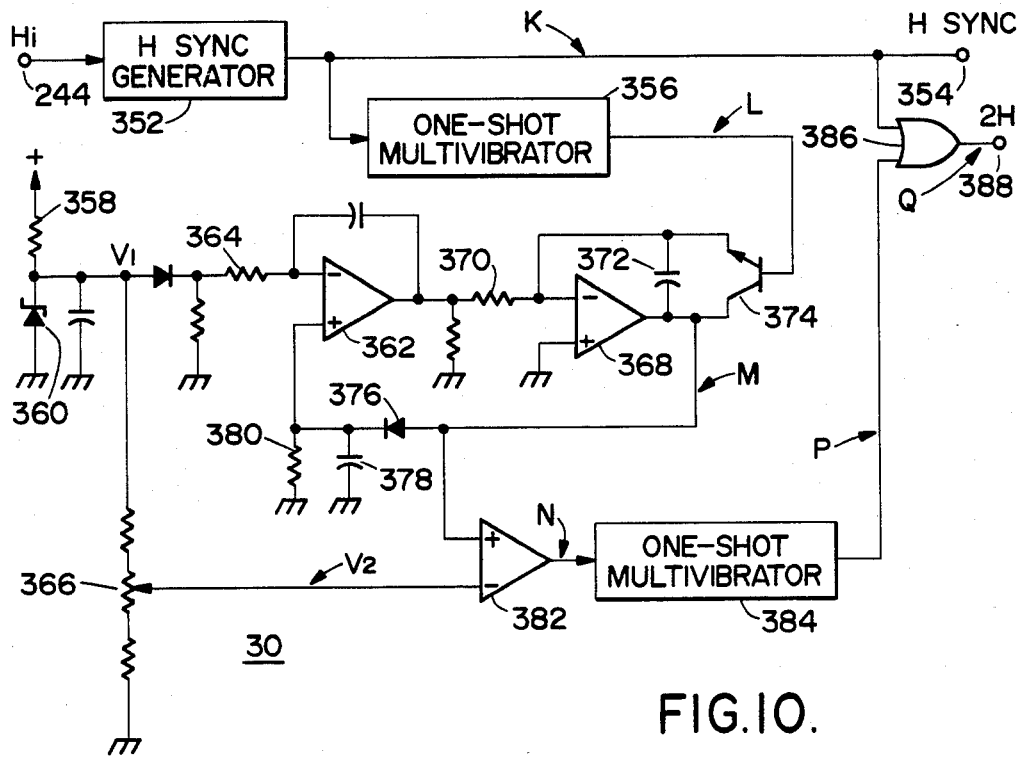
FIG. 10 is a partly schematic block diagram of a second component of the test pattern generator.
Figure 11:
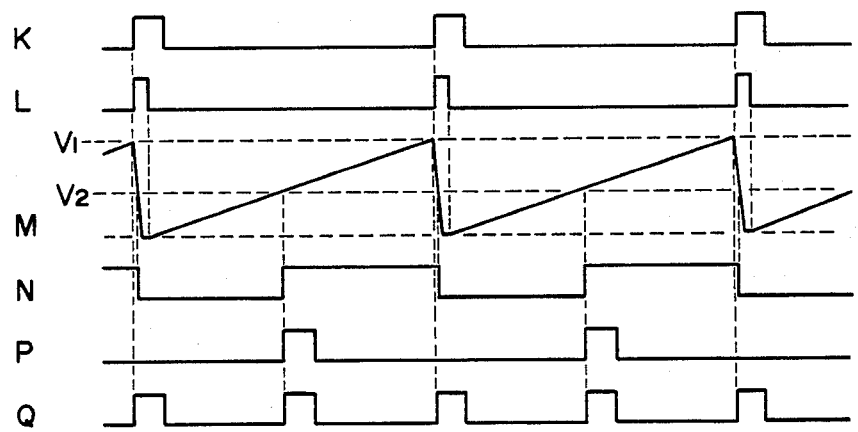
FIG. 11 shows waveforms for explaining the operation of FIG. 10.

Horizontal sync and control signal generator 30 is shown in detail in FIG. 10. Horizontal sync generator 352 consists of a one-shot multivibrator which is triggered by the horizontal interval hold-off signal Hi from vertical line generator 20 and generates the horizontal sync pulses (waveform K in FIG. 11) which are applied to terminal 354 and one-shot multivibrator 356. Multivibrator 356 generates a short pulse (waveform L) in response to the horizontal sync pulse. A constant voltage $V_1$ is obtained from a series circuit consisting of resistor 358 and zener diode 360, and is applied to comparator 362 through diode 364 and to a voltage divider mainly consisting of potentiometer 366. The output from comparator 362 is applied to a Miller integrator consisting of inverting amplifier 368, resistor 370 and capacitor 372. Switching transistor 374 shorts capacitor 372 in response to the output pulses from multivibrator 356. Thus, the Miller integrator generates a ramp signal (waveform M) in synchronism with the horizontal sync pulses. It should be noted that the width of the output pulses from multivibrator 356 is very small but it is enough to discharge capacitor 372. The peak voltage of the ramp signal generated by the Miller integrator is detected by a peak detector consisting of diode 376, capacitor 378 and resistor 380, and is applied to comparator 362. Diode 364 compensates for the voltage drop across diode 376. Comparator 362 compares the reference voltage $V_1$ from zener diode 360 with the voltage from the peak detector, and so the amplitude of the ramp signal is kept constant regardless of the horizontal sync frequency, i.e., the slope of the ramp signal is automatically controlled in accordance with the horizontal sync frequency.

Potentiometer 366 and the associated resistors generate a voltage $V_2$ which is half of the reference voltage $V_1$, and comparator 382 compares the ramp signal with the voltage $V_2$. Thus, the output pulse from comparator 382 (waveform N) occurs every half period of the ramp signal regardless of the frequency of the horizontal sync pulses. The pulse from comparator 382 triggers one-shot multivibrator 384 which generates a pulse having approximately the same pulse width as the horizontal sync pulse (waveform P). The pulses from horizontal sync generator 352 and multi-vibrator 384 are combined by OR gate 386 to produce the control signal 2H (waveform Q) at terminal 388. Thus, the frequency of the control signal is double the frequency of the horizontal sync pulses, and the control signal is synchronized with the horizontal sync pulse K regardless of the frequency of the sync pulse.

FIG. 12 shows the vertical sync generator 40 and the associated controller 42. BCD (binary coded demical) counter 492 receives at a clock terminal CLK the control signal 2H (waveform Q) from terminal 388 and counts it. The controller 42 comprises several (four in the case of the illustrated sync generator) thumbwheel switches 496 which are used to set the number of scan lines per frame (two fields). This is a decimal number of up to four digits. Each switch provides a four bit output representing a single decimal digit. Thus, the output of the controller 42 represents the number of scan lines in BCD form. Digital comparator 494 compares the BCD outputs from counter 492 and controller 42, and applies a vertical sync pulse to terminal 498 and the clear terminal CLR of counter 492 when the two BCD outputs are equal. When counter 492 is cleared by the vertical sync pulse, the contents of counter 492 become zero and the control signal is counted again. If switches 496 are set to an odd number, for example "0005", comparator 494 generates the output waveform R1 shown in FIG. 13, and the corresponding raster scan display is shown in FIG. 14. In FIG. 14, continuous lines are in the first field and dotted lines are in the second field. If switches 496 are set to an even number, for example "0006", comparator 494 generates the output waveform R2 and the corresponding raster scan display is shown in FIG. 15. In this instance, the continuous and dotted lines overlap each other. Thus, the odd and even numbers respectively select the interlaced and non-interlaced formats.

The vertical blanking generator 46 is not particularly illustrated but is similar to the circuit of FIG. 12, and thumb wheel switches of controller 44 select the number of scan lines in the vertical blanking period.

Figure 16:
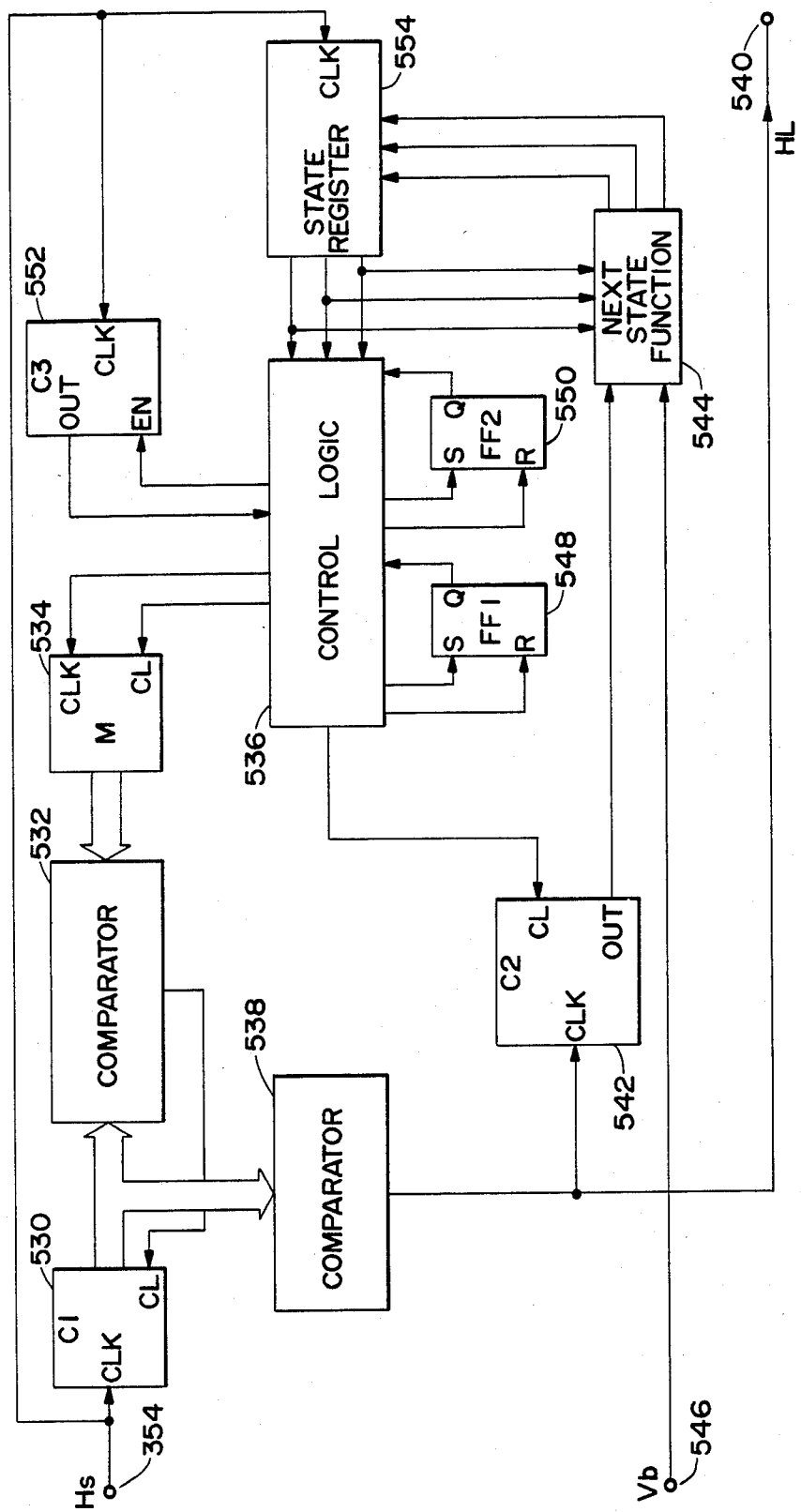
FIG. 16 is a block diagram of a fourth component of the test pattern generator.

FIG. 16 is a block diagram of horizontal line generator 50. Horizontal line generator 50 receives the horizontal sync signal H sync and the vertical blanking signal Vb for generating a horizontal line signal (HL). Summing circuit 60 sums the horizontal line signal and the vertical line signal, and output amplifier 70 mixes the horizontal and vertical sync signals, the horizontal and vertical blanking signals and the output of the summing circuit 60 and supplies an output video signal at terminal 80. The brightness of the lines on the raster scan display may be controlled by adjusting the amplitudes of the line signals.

Horizontal line generator 50 comprises counter 530 which counts the horizontal sync pulse at terminal 354, and memory circuit 534 which stores the number (M) of dark scan lines between one bright line (the horizontal line) and the next bright line. Comparator 532 compares the contents of counter 530 (C1) with the contents of memory circuit 534 (M) and applies an output to the clear terminal of counter 530 when the contents of counter 530 and memory 534 are equal. Memory circuit 534 may be a counter which receives clock and clear signals (CLK and CL) from control logic circuit 536. Comparator 538 compares the contents (C1) of counter 530 with zero, and generates a horizontal line output signal HL for one horizontal active line when the contents of counter 530 are zero, i.e., comparator 538 has confirmed that counter 530 is cleared. The horizontal line output signal from comparator 538 is applied to output terminal 540 and the clock terminal (CLK) of counter 542 which receives a clear signal at terminal CL from control logic circuit 536. When counter 542 has counted a predetermined number, N, of horizontal line signals, it applies an output signal to next state function circuit 544, which also receives the vertical blanking signal (Vb) from terminal 546. First and second flip-flop 548 and 550 (FF1 and FF2) receive their set and reset signals from control logic circuit 536 and apply their Q outputs to circuit 536. The clock terminals (CLK) of counter 552 and state register 554 receive the horizontal sync signal from terminal 354. Counter 552 receives an enable signal (EN) from control logic circuit 536, and applies an output signal to circuit 536 every time that it counts a predetermined number (N−1) of horizontal sync signals. State register 554 receives a next state signal (three bits) from next state function circuit 544, and applies a state signal (three bits) to control logic circuit 536 and next state function circuit 544. Circuits 536 and 544 consist of combinations of logic gates.

Figure 17A:
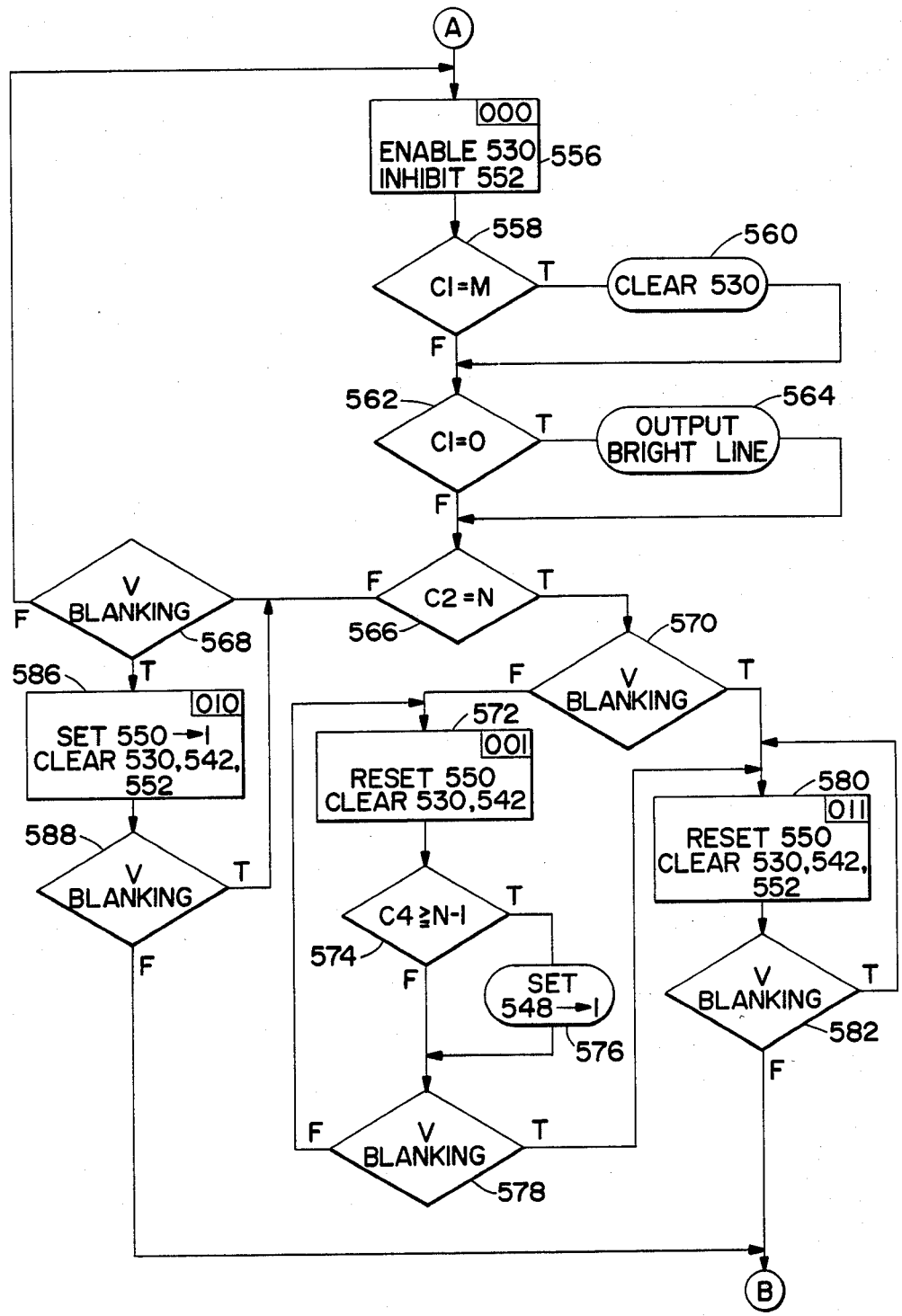
FIGS. 17A and B are flow charts for explaining the operation of FIG. 16.
Figure 17B:
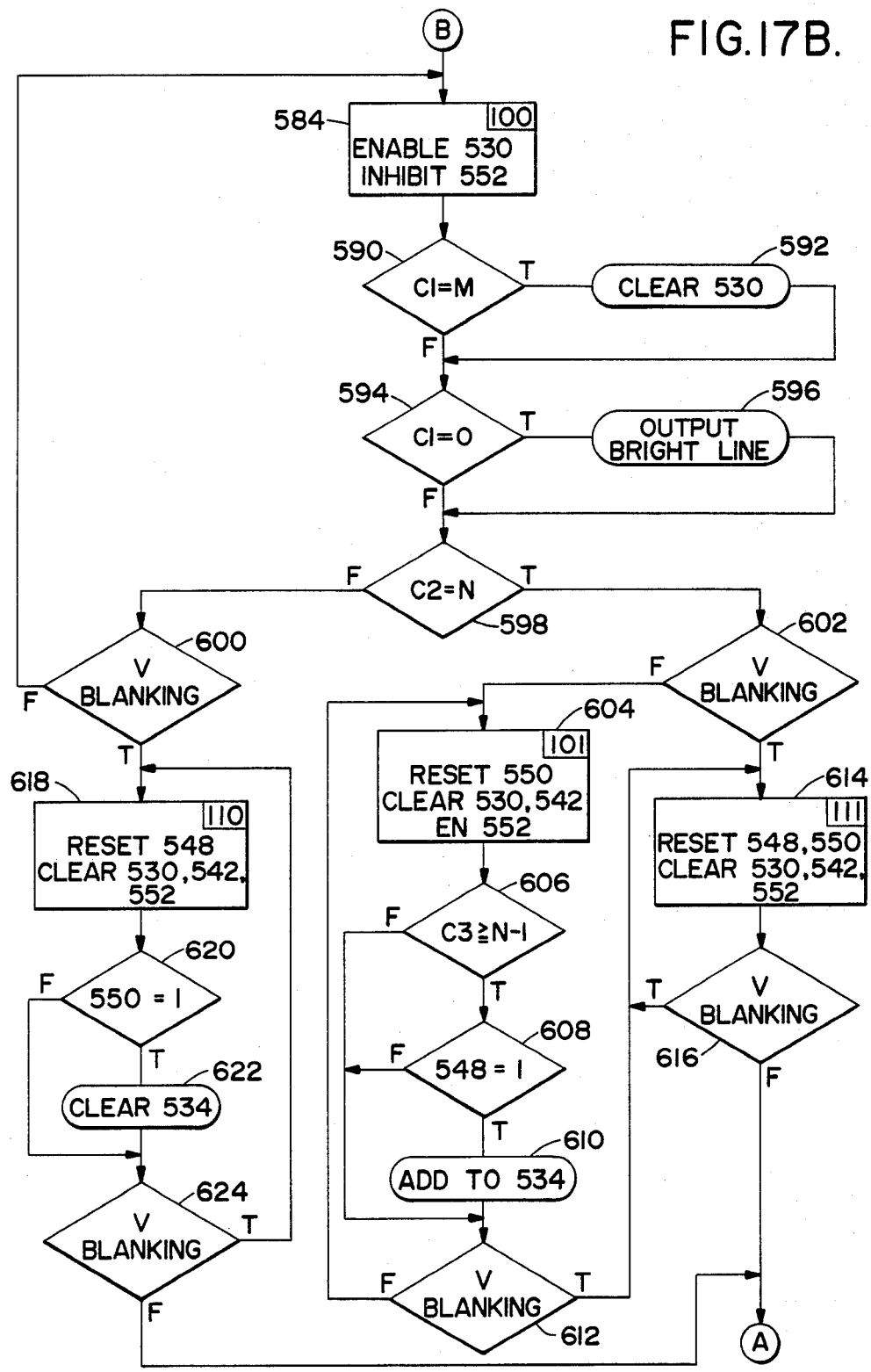

FIGS. 17A and 17B are flow charts for explaining the operation of FIG. 16. In FIGS. 17A and 17B, "T" and "F" mean "true" and "false", respectively. In step 556, the content of state register 554 is "000"; counter 530 counts the horizontal sync signal and counter 552 is inhibited. In step 558, comparator 532 compares the contents (C1) of counter 530 with the contents (M) of memory 534. If these contents are equal (C1=M), comparator 532 clears first counter 530 (step 560). In step 562, comparator 538 detects whether the contents of counter 530 are zero (C1=0). If the content of counter 530 are zero, comparator 538 generates an output pulse (horizontal line output signal HL) in step 564. Counter 542 counts the output pulses from comparator 538. Step 566 represents a determination of whether the contents (C2) of counter 542 are N. Next state function circuit 544 judges when the vertical blanking signal occurs (steps 568 and 570). If C2 is less than N, steps 556 through 568 are repeated until the vertical blanking signal occurs.

If C2=N occurs before the vertical blanking signal, the contents of state register 554 change to "001" in response to the output from next state function circuit 544, and the operation proceeds to step 572. In step 572, counter 552 is enabled by control logic circuit 536 which receives the state signal "001", and counter 552 counts the horizontal sync signal. If counter 552 generates an output, i.e., if the contents of counter 552 (C3) are equal to or larger than N−1 (step 574), control logic circuit 536 sets flip-flop 548 to "1" in step 576. This indicates that the remainder R (see FIG. 2) is too large. In step 578, next state function circuit 544 judges whether the vertical blanking signal occurs. This cycle continues via steps 572 through 578 until the vertical blanking signal occurs.

When next state function circuit 544 detects that the vertical blanking begins in step 570 or 578, the state register 554 is advanced to "011" in response to next state function circuit 544 and the operation proceeds to step 580. In this step 580, control logic circuit 536 resets second flip-flop 550 and clears counters 530, 542 and 552 to zero. (Counter 552 is cleared by removing the enable signal.) The state "011" indicates that M (see FIG. 2) was not too large. When next state function circuit 544 detects that the vertical blanking has ended (step 582), the next state function circuit advances to "100" and the operation proceeds to step 584.

When in the state "000", if the contents of counter 542 (C2) were not equal to N when the vertical blanking occurred, the state would have advanced to "010" (step 586) through steps 566 and 568 in response to the operation of next state function circuit 544. In step 586, flip-flop 550 would have been set to "1" by control logic circuit 536 to indicate that M was too large. Moreover, counters 530, 542 and 552 would have been set to zero by control logic circuit 536. When next state function circuit 544 detects that the vertical blanking ends in step 588, circuit 544 advances the state register 554 to "100" and the operation proceeds to step 584.

The process of generating the output proceeds in the state "100" just as it does in the state "000", i.e., steps 584 and 590 through 602 are the same as steps 556 through 570. If the contents of counter 542 are determined to be equal to N before the vertical blanking occurs, the state register 554 advances to "101" and the operation proceeds to step 604. In step 604, control logic circuit 536 resets flip-flop 550 to zero, clears counters 530 and 542 to zero, and enables counter 552.

Counter 552 counts the remainder R in a divide-by (N−1) fashion. Control logic 536 judges, in step 606, whether the contents of counter 552 are equal to or larger than N−1, i.e., counter 552 generates an output if its contents are equal to or larger than N−1. In addition, control logic circuit 536 detects whether flip-flop 548 is set in step 608. If C3 is equal to or larger than N−1 and flip-flop 548 is set, in step 610 control logic circuit 536 adds one to the clock terminal of memory circuit 534 for every N−1 extra lines. When next state function circuit 544 detects in step 612 that the vertical blanking occurs, the state register 554 is advanced to state "111" and the operation proceeds to step 614.

In step 614, control logic circuit 536 resets flip-flop 548 and 550 and counters 530 and 542 and 552 to zero preparatory to starting the cycle over. When the vertical blanking ends in step 616, the state returns to "000".

When in the state "100", if the contents of counter 542 were not equal to N when the vertical blanking occurred in steps 598 and 600, the state would have advanced to "110" (step 618). Control logic circuit 536 would reset flip-flop 548 and clear counters 530, 542 and 552 to zero. When circuit 536 detects in step 620 that flip-flop 550 has been set, memory circuit 534 is cleared in step 622. When the vertical blanking ends in step 624, the state returns to "000" of step 556.

The above described sequence of operations is repeated, and the predetermined number (N) of equally spaced horizontal lines are displayed on the raster scan display apparatus.

It will be understood from the foregoing description that the horizontal line generator 50 can generate a signal which will provide a display consisting of a specified number of equally spaced horizontal lines regardless of the number of raster lines in one field. The number (B) of the raster lines in the vertical blanking period may be adjusted by controller 44 of vertical blanking generator 46, so that the remainder R can be made equal to zero for any given total number of scan lines in one field. The horizontal line generator can be used with both interlaced and non-interlaced formats. The width of the bright horizontal line can be controlled by adjusting the clear period of counter 530.

It will be understood from the foregoing description that the described test pattern generator can generate a test pattern signal to be applied to systems with different vertical and horizontal frequencies and scan lines per field. Moreover, the pattern generator can provide a display of a substantially constant test pattern on a raster scan display apparatus independently of the vertical and horizontal scanning frequencies and of the number of scan lines per field.

It will be appreciated by those skilled in the art the invention is not restricted to the particular circuits which have been described and illustrated, since modifications can be made without departing from the scope of the invention as defined in the appended claims. For example, summing circuit 60 may have a switch for selecting either the vertical line pulses or the horizontal line pulses, to provide the pattern shown in FIG. 1 or FIG. 2, instead of the combination of horizontal and vertical line pulses which provide the pattern shown in FIG. 3. The polarity of the output of the summing amplifier may be reversed, so as to provide a pattern of dark lines against a bright background instead of vice versa. As for the horizontal line generator, the control circuit consisting of control logic circuit 536, next state function circuit 544, state register 554 and flip-flops 548 and 550 may be a microprocessor. The counting device formed by counter 530, memory circuit 534 and comparators 532 and 538 may be a programmable counter. The ramp generator of the vertical line generator may include a Miller integrater.

I claim:

1. A test pattern generator for generating a test pattern signal which can be applied to a raster scan display apparatus having first and second mutually orthogonal scanning directions to cause the apparatus to display a test pattern consisting of a first set of spaced lines oriented in said first direction and a second set of spaced lines oriented in said second direction, said test pattern generator comprising:
    a first pulse generating circuit for generating at least a first pulse train and a second pulse train, said first pulse train including, between successive pulses of said second pulse train, a number of pulses equal to the number of lines in said first set;
    a second pulse generating circuit for receiving said second pulse train and generating at least a first sync pulse train;
    a third pulse generating circuit connected to the second pulse generating circuit for generating a second sync pulse train and a fifth pulse train; and
    a fourth pulse generating circuit connected to the second and third pulse generating circuits for generating a sixth pulse train in response to the first sync pulse train and the fifth pulse train, the sixth pulse train including, between successive pulses of the fifth pulse train, a number of pulses equal to the number of lines in said second set, and each pulse of the sixth pulse train being in a predetermined timed relation to a pulse of the first sync pulse train,
    whereby pulse trains from said pulse generating circuits may be combined to form a test pattern signal.

2. A test pattern generator according to claim 1, wherein said first pulse generating circuit comprises a ramp generator for repeatedly generating a ramp waveform, comparison means connected to receive said ramp waveform and generate a pulse of said first pulse train when the voltage of the ramp waveform attains a predetermined level, and resettable counter means for providing a pulse of said second pulse train in response to the voltage of the ramp waveform attaining a predetermined level a number of times equal to the number of lines in said first set.

3. A test pattern generator according to claim 2, wherein the predetermined voltage level at which the comparison means generate a pulse of said first pulse train is below the predetermined voltage level to which the resettable counter means respond.

4. A test pattern generator according to claim 3, wherein the comparison means comprise first and second comparators responsive to lower and higher voltage levels respectively and each having an input connected to receive the ramp waveform and output means, said first pulse train being generated at the output means of said first comparator and the output means of the second comparator being operatively connected to the resettable counter means.

5. A test pattern generator according to claim 2, wherein said resettable counter means comprise a resettable counter for counting the number of times that the voltage of the ramp waveform attains the last-mentioned predetermined voltage level and a circuit for inhibiting operation of the ramp generator for a predetermined time in response to the contents of the resettable counter attaining a number equal to the number of lines in said first set.

6. A test pattern generator according to claim 1, wherein said second pulse generating circuit comprises a sync pulse generator for receiving said second pulse train and having an output at which said first sync pulse train is provided, and a control pulse generating circuit connected to the output of the sync pulse generator for receiving said first sync pulse train and having an output at which a train of control pulses in predetermined timed relationship to the pulses of the first sync pulse train is generated, the output of the control pulse generating circuit being operatively connected to said third pulse generating circuit.

7. A test pattern generator according to claim 6, wherein said control pulse generating circuit comprises a constant amplitude ramp generator connected to the sync pulse generator for generating a periodic ramp waveform of constant peak-to-peak voltage and of the same frequency as the first sync pulse train, comparison means for comparing the voltage of the ramp waveform with a predetermined level and providing an output signal when the voltage of the ramp waveform attains said predetermined level, and pulse-forming means for receiving the output signal provided by the comparison means and generating a control pulse in response thereto whereby a train of pulses in predetermined timed relation to the periodic ramp waveform is generated.

8. A test pattern generator according to claim 7, further comprising a gate circuit connected to receive both the synchronizing pulses and the pulses generated by the control pulse generating circuit and to produce a composite pulse train which is applied to said third pulse generating circuit.

9. A test pattern generator according to claim 1, wherein said second pulse generating circuit is operative to produce both said first sync pulse train and a control pulse train, said control pulse train being twice the frequency of the first sync pulse train, and wherein the third pulse generating circuit is connected to receive the control pulse train.

10. A test pattern generator according to claim 1, wherein said third pulse generating circuit has input means for receiving an input pulse train from the second pulse generating circuit, counting means for counting the number of pulses received at said input means, selection means for selecting the number of pulses of the input pulse train for each pulse of the second sync pulse train and for each pulse of the fifth pulse train, and comparison means for comparing the contents of the counting means with the contents of the selection means and providing pulses of the second sync pulse train and of the fifth pulse train accordingly.

11. A test pattern generator according to claim 10, wherein said counting means comprise first and second resettable BCD counters, said selection means comprise first and second BCD selectors, and said comparison means comprise a first binary comparator for comparing the contents of the first BCD counter and the first BCD selector and providing a pulse of the second sync pulse train and clearing the first BCD counter if the contents of the first counter and the first selector are equal, and a second binary comparator for comparing the contents of the second BCD counter and the second BCD selector and providing a pulse of the fifth pulse train and clearing the second BCD counter if the contents of the second counter and the second selector are equal.

12. A test pattern generator according to claim 1, wherein the fourth pulse generating circuit comprises a first input terminal connected to the second pulse generating circuit for receiving the first sync pulse train, a second input terminal connected to the third pulse generating circuit for receiving the fifth pulse train, a first counting device for counting the number of input pulses received at said first input terminal and generating a pulse of the sixth pulse train every n input pulses, where n is a first predetermined number, a second counting device for generating an output signal when the number of pulses of the sixth pulse train generated by said first counting device is equal to the number of lines in said second set, a third counting device for counting the number of input pulses received at said first input terminal subsequent to generation of an output signal by said second counting device and until a pulse of the fifth pulse train is received at said second input terminal, and control means for reducing the value of n if the pulse of the fifth pulse train is received before an output signal is generated by the second counting device and increasing the value of n if the contents of the third counting device are at least equal to a second predetermined number when the pulse of the fifth pulse train is received, whereby each pulse of the sixth train is in a predetermined time relation to a pulse of said first sync pulse train and the number of pulses of the sixth pulse train between successive pulses of the fifth pulse train is equal to the number of lines in said second set, regardless of the number of pulses of sad first sync pulse train between successive pulses of the fifth pulse train.

13. A test pattern generator according to claim 12, wherein said control means are operative to reduce the value of n to a predetermined value if the pulse of the fifth pulse train is received before an output signal is generated by the second counting device, and thereafter to increase the value of n until the contents of the third counting device are less than said second predetermined number.

14. A test pattern generator according to claim 13, wherein said control means are such that said second predetermined number is less by one than the number of lines in said second set.

15. A test pattern generator according to claim 13, wherein said predetermined value is zero.

16. A pulse generating circuit for generating a first pulse train and a second pulse train, and comprising a ramp generator for repeatedly generating a ramp waveform, comparison means connected to receive said ramp waveform and generate a pulse when the voltage of the ramp waveform attains a predetermined level, a resettable counter for counting the number of times that the voltge of the ramp waveform attains a predetermined level and providing a pulse each time that said number attains a selected value, and means for inhibiting operation of the ramp generator for a predetermined time in response to each pulse provided by said resettable counter.

17. A pulse generating circuit according to claim 16, wherein said ramp generator comprises a constant current source, a capacitor connected in charging relationship with the constant current source, and a switch device connected in parallel with the capacitor and having an open condition in which it permits the capacitor to be charged and a closed condition in which it discharges the capacitor.

18. A pulse generating circuit according to claim 17, wherein the switch device comprises a transistor having its emitter and collector connected to opposite respective terminals of the capacitor, and the circuit further comprises timing means operatively connecting the output of the comparison means to the base of the transistor for switching the transistor to an on condition when the voltage of the ramp waveform attains the last-mentioned predetermined level, thereby to discharge the capacitor, holding the transistor in its on condition for a second predetermined time, and switching the transistor to an off condition at the end of said second predetermined time, thereby to permit the capacitor to recharge.

19. A pulse generating circuit according to claim 18, wherein said comparison means comprise a comparator with hysteresis having output means operatively connected to the base of the transistor, and the timing means comprise a one-shot multivibrator connected to the output means of the comparator and responsive to the pulse generated by the comparator to generate a pulse of a predetermined duration which is greater than the duration of the pulse generated by the comparator.

20. A pulse generating circuit according to claim 19, wherein said one-shot multivibrator has an output which is connected to the resettable counter, and the inhibiting means comprise a second one-shot multivibrator responsive to the pulse provided by the resettable counter to generate a pulse for holding the transistor in its on condition for the first-mentioned predetermined time.

21. A pulse generating circuit according to claim 17, wherein said comparison means comprise a first comparator for generating a pulse of said first pulse train when the voltage of the ramp waveform attains the first-mentioned predetermined level, and a second comparator operatively connected to said resettable counter and operative to generate a pulse when the voltage of the ramp waveform attains a higher predetermined level, and wherein the inhibiting means comprise a one-shot multivibrator responsive to the pulse provided by the resettable counter to generate a pulse of said second pulse train, the last-mentioned pulse being operative to inhibit operation of the ramp generator for said predetermined time.

22. A pulse generating circuit according to claim 16, wherein said ramp generator comprises a sawtooth oscillator, the comparison means comprise a comparator for generating a pulse of said first pulse train when the voltage of the ramp waveform attains said predetermined level, and the inhibiting means comprise a one-shot multivibrator responsive to the pulse provided by the resettable counter to generate a pulse of said second pulse train, the last-mentioned pulse being operative to inhibit operation of the ramp generator for said predetermined time.

23. A pulse generating circuit according to claim 16, wherein the ramp generator has an operative condition, in which the voltage of the ramp waveform increases, and an inhibited condition, in which the voltage of the ramp waveform decreases to a predetermined level and remains at that level until the ramp generator enters its operative condition, and wherein the comparison means has an output which is operatively connected to the ramp generator, whereby the ramp generator its placed in its inhibited condition when a pulse is generated by the comparison means.

24. A pulse generating circuit according to claim 23, wherein the comparison means comprise a comparator, and the circuit further comprise timing means operatively connecting the output of the comparator to the ramp generator.

25. A pulse generating circuit for generating a pulse train, comprising a first input terminal for receiving an input pulse train, a second input terminal for receiving a blanking signal, a first counting device for counting the number of input pulses received at said first input terminal and generating an output pulse every n input pulses, where n is a first predetermined number, a second counting device for counting the number of output pulses generated by said first counting device and generating an output signal when a second predetermined number of said output pulses has been generated, a third counting device for counting the number of input pulses received at said first input terminal subsequent to generation of an output signal by said second counting device and until a blanking signal is received at said second input terminal, and control means for reducing the value of n if the blanking signal is received before an output signal is generated by the second counting device and increasing the value of n if the contents of the third counting device are at least equal to a third predetermined number when the blanking signal is received, whereby said pulse generating circuit is operative to generate a train of said output pulses with each pulse of the train being in a predetermined timed relation to a pulse of said input pulse train and the number of output pulses between successive blanking signals being equal to said second predetermined number, regardless of the number of pulses of said input pulse train between successive blanking signals.

26. A pulse generating circuit according to claim 25, wherein said first counting device comprises a counter for counting the number of input pulses received at said first input terminal, a memory circuit loaded with a count equal to n, and comparator means for comparing the contents of the counter with the contents of the memory circuit and clearing the counter when the contents of the counter are equal to the contents of the memory and providing an output pulse.

27. A pulse generating circuit according to claim 26, wherein the comparator means comprise a first comparator for comparing the contents of the counter with the contents of the memory circuit and clearing the counter when the contents of the counter are equal to the contents of the memory circuit, and a second comparator for comparing the contents of the counter with zero and providing said output pulse when the contents of the counter are equal to zero.

28. A pulse generating circuit according to claim 25, wherein said control means are operative to reduce the value of n to a predetermined value if the blanking signal is received before an output signal is generated by the second counting device, and thereafter to increase the value of n until the contents of the third counting device are less than said third predetermined number.

29. A pulse generating circuit according to claim 28, wherein said control means are such that said third predetermined number is less by one than said second predetermined number.

30. A pulse generating circuit according to claim 28, wherein said predetermined value is zero.

* * * * *

UNITED STATES PATENT AND TRADEMARK OFFICE
CERTIFICATE OF CORRECTION

PATENT NO. : 4,495,519

DATED : January 22, 1985

INVENTOR(S) : Clayton C. Wahlquist

It is certified that error appears in the above—identified patent and that said Letters Patent is hereby corrected as shown below:

Column 1, line 11, reads "for" should be --of--.

Column 5, line 1, reads "multi-vibrator" should be --multivibrator--.

Column 5, line 5, reads "multi-vibrator" should be --multivibrator--.

Column 12, line 32, reads "sad" should be --said--.

Column 12, line 55, reads "voltge" should be --voltage--.

Signed and Sealed this

Thirtieth Day of July 1985

[SEAL]

Attest:

DONALD J. QUIGG

Attesting Officer — Acting Commissioner of Patents and Trademarks